(12) United States Patent
Lecoeuche

(10) Patent No.: US 10,775,246 B2
(45) Date of Patent: Sep. 15, 2020

(54) SINGLE-BAND DISTRIBUTED TEMPERATURE SENSING

(71) Applicant: VIAVI SOLUTIONS INC., San Jose, CA (US)

(72) Inventor: Vincent Lecoeuche, Tarentaise (FR)

(73) Assignee: VIAVI SOLUTIONS INC., San Jose, CA (US)

(*) Notice: Subject to any disclaimer, the term of this patent is extended or adjusted under 35 U.S.C. 154(b) by 349 days.

(21) Appl. No.: 15/945,501

(22) Filed: Apr. 4, 2018

(65) Prior Publication Data

US 2019/0277707 A1  Sep. 12, 2019

(51) Int. Cl.
*G01K 3/00* (2006.01)
*G01K 11/00* (2006.01)
*G01J 5/00* (2006.01)
*G01K 11/32* (2006.01)
*G01K 3/06* (2006.01)

(52) U.S. Cl.
CPC .............. *G01K 11/32* (2013.01); *G01K 3/06* (2013.01); *G01K 2011/324* (2013.01)

(58) Field of Classification Search
USPC ................... 374/137, 130, 131, 161, 124
See application file for complete search history.

(56) References Cited

U.S. PATENT DOCUMENTS

| | | | | |
|---|---|---|---|---|
| 5,217,306 A * | 6/1993 | Wada | ...................... | G01K 11/32 356/301 |
| 2003/0234921 A1* | 12/2003 | Yamate | .................. | G01K 15/00 356/73.1 |
| 2006/0245468 A1* | 11/2006 | Hartog | .................. | G01K 11/32 374/161 |
| 2007/0165691 A1* | 7/2007 | Taverner | ................ | G01K 11/32 374/120 |
| 2009/0240455 A1* | 9/2009 | Fromme | ................ | G01K 11/32 702/85 |

(Continued)

FOREIGN PATENT DOCUMENTS

WO    2009/011766 A1    1/2009
WO    2009/092436 A1    7/2009

OTHER PUBLICATIONS

Arthur H. Hartog, "An Introduction to Distributed Optical Fibre Sensors", Jan. 31, 2018 by CRC Press, 5 pages.

*Primary Examiner* — Mirellys Jagan
(74) *Attorney, Agent, or Firm* — Mannava & Kang, P.C.

(57) ABSTRACT

In some examples, a temperature distribution sensor may include a laser source to emit a laser beam that is tunable over a wavelength range. The wavelength range may be less than a Raman bandwidth in a device under test (DUT), or of-the-order-of the Raman bandwidth in the DUT. A pulsed source may apply a pulse drive signal to the laser beam or to a modulator to modulate the laser beam that is to be injected into the DUT. A bandpass filter may be operatively disposed between the laser source and the DUT, and may be configured to an anti-Stokes wavelength that is narrower than the Raman bandwidth. A photodiode may be operatively disposed between the bandpass filter and the DUT to acquire, from the DUT, anti-Stokes optical time-domain reflectometer traces for two preset wavelengths of the laser beam to determine a temperature distribution for the DUT.

20 Claims, 9 Drawing Sheets

(56) References Cited

U.S. PATENT DOCUMENTS

| | | | | |
|---|---|---|---|---|
| 2009/0252193 A1* | 10/2009 | Hill | ............... | G01K 15/005 |
| | | | | 374/1 |
| 2011/0231135 A1* | 9/2011 | Suh | ............... | G01K 15/00 |
| | | | | 702/99 |
| 2013/0028289 A1* | 1/2013 | Zhang | ............... | G01K 11/32 |
| | | | | 374/161 |
| 2013/0156066 A1* | 6/2013 | Kwon, II | ............... | G01K 11/32 |
| | | | | 374/161 |
| 2015/0260588 A1* | 9/2015 | Babin | ............... | G01K 11/32 |
| | | | | 374/161 |
| 2016/0018271 A1* | 1/2016 | Shida | ............... | G01K 11/32 |
| | | | | 374/161 |
| 2017/0205255 A1* | 7/2017 | Nannipieri | ............... | G01D 5/35364 |

* cited by examiner

SINGLE-BAND DISTRIBUTED TEMPERATURE SENSING

PRIORITY

The present application claims priority under 35 U.S.C. 119(a)-(d) to French patent application number 1852068, having a filing date of Mar. 9, 2018, the disclosure of which is hereby incorporated by reference in its entirety.

BACKGROUND

Distributed temperature sensing may be described as the measurement of temperature by using optical fibers. In distributed temperature sensing, an optical fiber may function as a sensor. A distributed temperature sensing system may provide temperature measurements at specified distances along the length of the optical fiber. For example, the specified distances may include a spatial resolution of one meter. The temperature measurements may be made to a specified accuracy (e.g., ±0.5° C.).

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
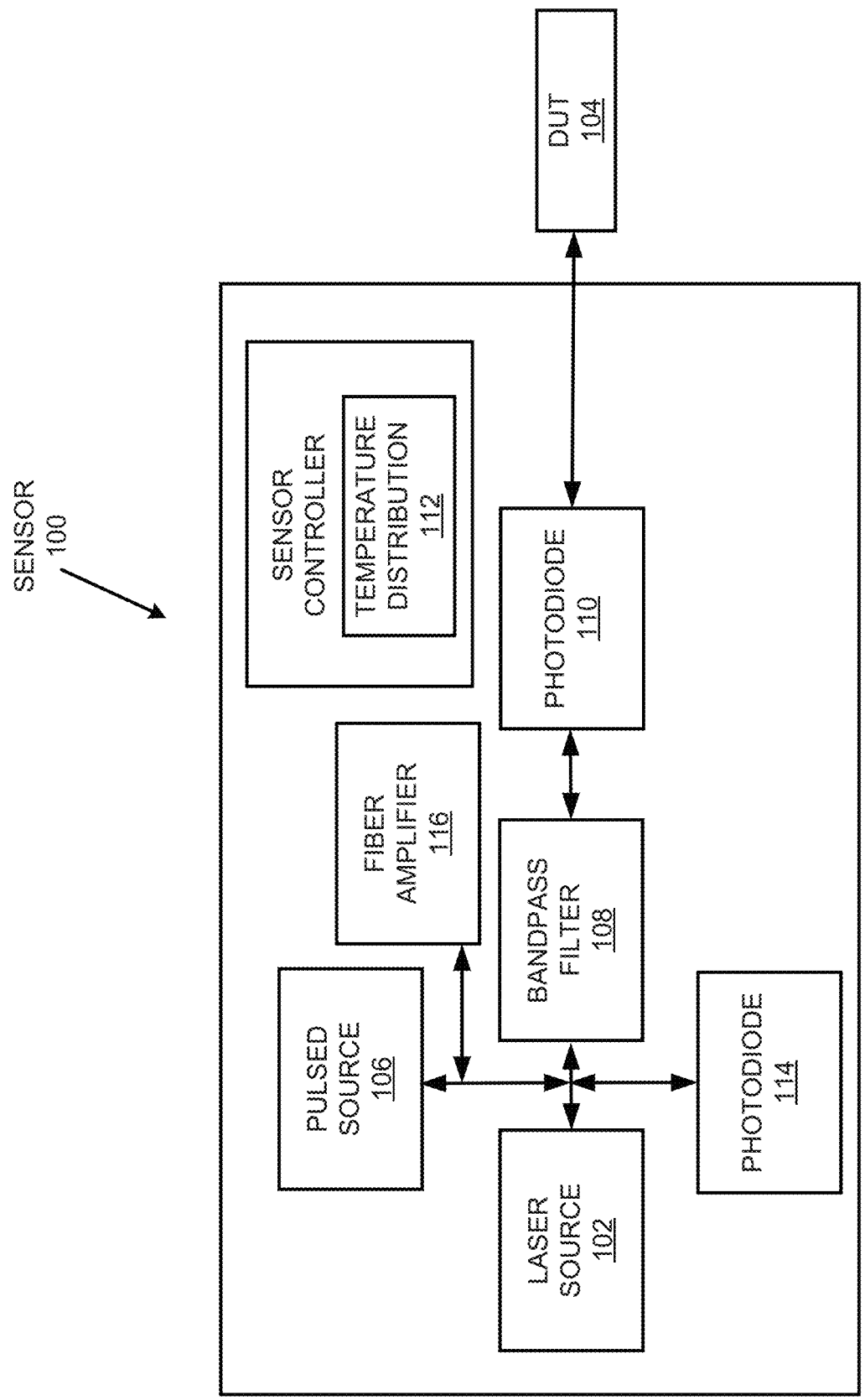
FIG. 1 illustrates an architecture of a temperature distribution sensor, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

An optical time-domain reflectometer (OTDR) is an optoelectronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include temperature distribution along a fiber, attenuation uniformity and attenuation rate, segment length, and location and insertion loss of connectors, splices, or any other optical components such as splitters or multiplexers.

With respect to temperature distribution measurement by an OTDR, an OTDR may include distributed temperature sensing (DTS). For DTS, Raman distributed temperature sensing may encounter different attenuations at different test wavelengths. For example, the different test wavelengths may include the Anti-Stokes (AS) wavelength, the Rayleigh wavelength, the Stokes wavelength, etc. In order to implement distributed temperature sensing, interrogation of an optical fiber may be performed by using several laser sources. Alternatively or additionally, the interrogation of the optical fiber may be dual-ended (e.g., on both ends of the optical fiber). For an interrogation that includes several laser sources, the distributed temperature sensing results may include inconsistencies in that differing spectral shapes of the various test signals used may result in different mean-weighted-average wavelengths and non-matching attenuation compensations. For an interrogation that is dual-ended, the need to access both ends of an optical fiber may add additional technical complexities, for example, with respect to a downhole end of the optical fiber.

Distributed temperature sensing may utilize the temperature sensitivity of an anti-Stokes Raman band in order to derive temperature. Since the transient Raman OTDR signal may also decay with attenuation, the signal may be normalized to the Stokes-OTDR trace. In this regard, a Rayleigh OTDR trace may also be utilized.

In order address the aforementioned technical challenges, a temperature distribution sensor as disclosed herein may utilize two spectral slices of the Anti-Stokes Raman to implement distributed temperature sensing. In this regard, the coefficient of the Anti-Stokes power variation versus temperature depends on the exact wavelength. As disclosed herein, this dependency may be evident from the literal equation of the anti-Stokes power derived from Bose-Einstein statistics. Further, the differential response at closely spaced wavelengths may be utilized as a new mechanism in distributed temperature sensing, with an inherently reduced differential loss, while also offering new means for differential losses compensation.

FIG. 1 illustrates an architecture of a temperature distribution sensor 100 (hereinafter referred to as "sensor 100"), according to an example of the present disclosure.

Referring to FIG. 1, the sensor 100, which may be an OTDR, may include a laser source 102 to emit a laser beam that is tunable over a wavelength range. The wavelength range may be less than a Raman bandwidth in a device under test (DUT) 104, or of-the-order-of the Raman bandwidth in the DUT 104. According to examples, the DUT 104 may include an optical fiber.

A pulsed source 106 may apply a pulse drive signal to the laser beam or to a modulator to modulate the laser beam that is to be injected into the DUT 104.

A bandpass filter 108 may be operatively disposed between the laser source 102 and the DUT 104. The bandpass filter 108 may be configured to an anti-Stokes wavelength that is narrower than the Raman bandwidth.

A photodiode 110 may be operatively disposed between the bandpass filter 108 and the DUT 104 to acquire, from the DUT 104, anti-Stokes optical time-domain reflectometer traces for two preset wavelengths of the laser beam to determine (e.g., by a sensor controller) a temperature distribution 112 for the DUT 104. In this regard, the temperature distribution 112 for the DUT 104 may be determined by determining a ratio of the anti-Stokes optical time-domain reflectometer traces for the two preset wavelengths of the laser beam. Further, with respect to the anti-Stokes optical time-domain reflectometer traces for the two preset wavelengths of the laser beam, a wavelength difference resulting from differing anti-Stokes spectral slices and a corresponding mean weighted average wavelength may be corrected.

A further photodiode 114 may be operatively disposed between the laser source 102 and the bandpass filter 108 to acquire Rayleigh optical time-domain reflectometer traces at the two preset wavelengths of the laser beam. In this regard, a differential attenuation between the two preset wavelengths of the laser beam may be corrected by determining a ratio of the Rayleigh optical time-domain reflectometer traces at the two preset wavelengths of the laser beam.

A fiber amplifier 116 may amplify the pulse drive signal applied to the laser beam or to the modulator to modulate the laser beam that is to be injected into the DUT 104. The amplifier 116 may comprise a temporal gating element that may suppress the amplified spontaneous emission and associated power fluctuations in between pulses.

According to examples, for the laser source 102 that includes a narrow linewidth tunable laser, the sensor 100 may be operated, using the narrow linewidth tunable laser source, in a Rayleigh mode to record a distributed acoustic sensing signal over the DUT 104.

Figure 2:
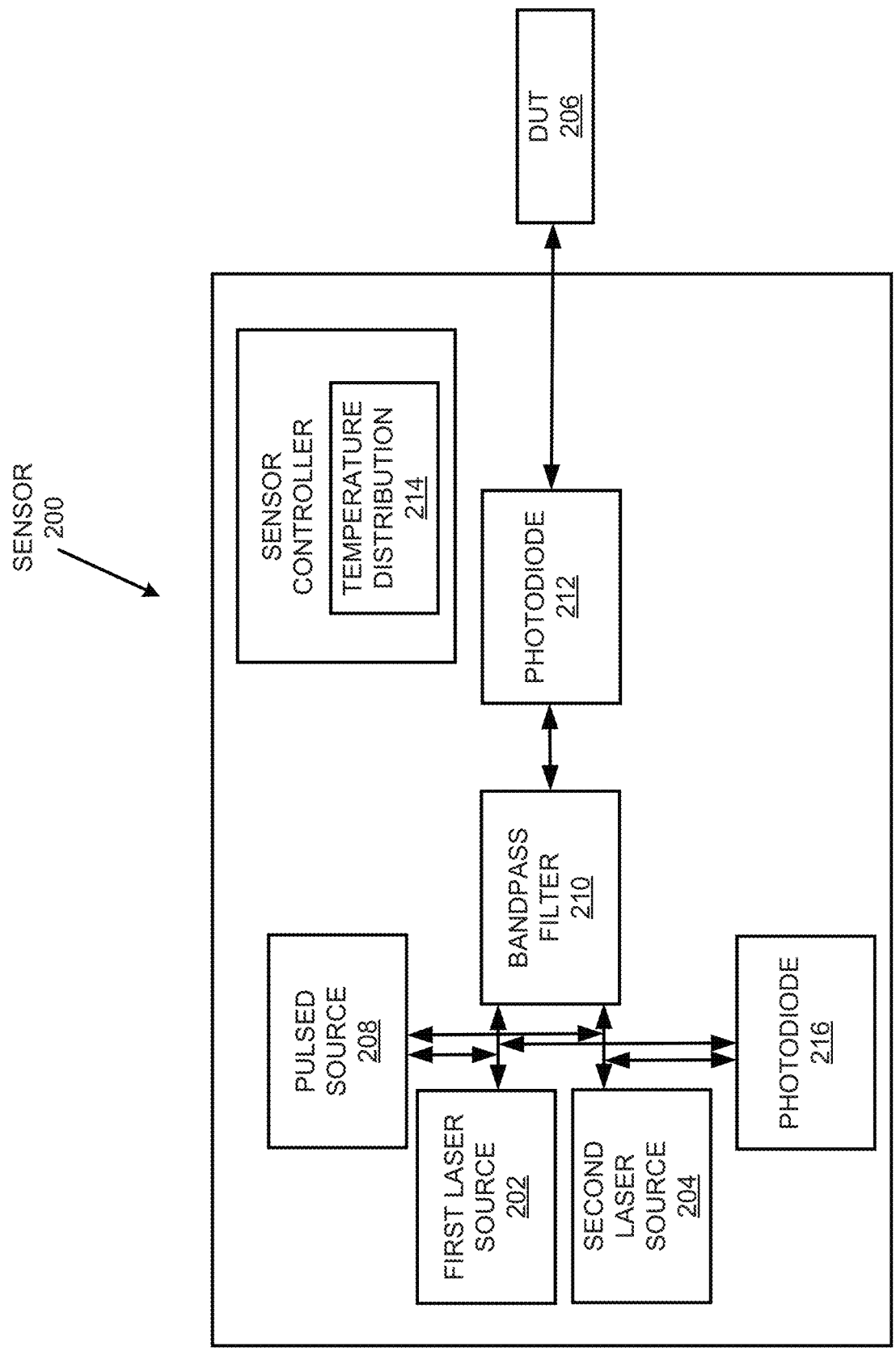
FIG. 2 illustrates an architecture of the temperature distribution sensor, according to another example of the present disclosure.

Referring to FIG. 2, an example of the sensor 100 that includes two laser sources may be designated as sensor 200. In this regard, the sensor 200, which may be an OTDR, may include a first laser source 202 to emit a first laser beam, and a second laser source 204 to emit a second laser beam. The first and second laser beams may include wavelengths that differ by a quantity that is less than a Raman bandwidth in a DUT 206, or of-the-order-of the Raman bandwidth in the DUT 206.

A pulsed source 208 may apply a pulse drive signal to the first and second laser beams or to a modulator to modulate the first and second laser beams that are to be injected into the DUT 206.

A bandpass filter 210 may be operatively disposed between the first laser source 202 and the second laser source 204 and the DUT 206. The bandpass filter 210 may be configured to an anti-Stokes wavelength that is narrower than the Raman bandwidth.

A photodiode 212 may be operatively disposed between the bandpass filter 210 and the DUT 206 to acquire, from the DUT 206, anti-Stokes optical time-domain reflectometer traces for two preset wavelengths of the first and second laser beams to determine a temperature distribution 214 for the DUT 206. The photodiode 212 may be connected to the passing port of the bandpass filter 210. The first laser source 202 and the second laser source 204 may be connected to the reflective port of the bandpass filter 210 (complementary of the passband function), and the DUT 206 to the common port of the bandpass filter 210.

A further photodiode 216 may be operatively disposed between the first laser source 202 and the second laser source 204 and the bandpass filter 210 to acquire Rayleigh optical time-domain reflectometer traces at the two preset wavelengths of the first and second laser beams.

Operation of the sensor 100 (and the sensor 200) is described in further detail with reference to FIGS. 3-8.

As disclosed herein, the sensor 100 (and the sensor 200) may utilize two spectral slices of the Anti-Stokes Raman to implement distributed temperature sensing. In this regard, the coefficient of the Anti-Stokes power variation versus temperature may depend on the exact wavelength. This dependency may be evident from the literal expression of the number of optical phonons η generated by thermal agitation and derived from Bose-Einstein statistics.

$$\eta(\Delta v, T) = \frac{1}{\exp\left(\frac{h\Delta v}{kT}\right) - 1} \qquad \text{Equation (1)}$$

Equation (1) represents the number of optical phonons generated by thermal agitation at frequency Δv, k represents the Boltzmann constant, and T represents the temperature of the DUT. The anti-Stokes power for each spectral component, each corresponding to a frequency shift Δv with regard to probe laser frequency, is directly proportional to this number of phonons. However, in certain implementations, a single mean-weighted-average Raman frequency shift of about 13.2 THz may be retained. The same considerations may apply to the Stokes component. Calculations based on a mean wavelength may result in the following relationship between temperature and Anti-Stokes/Stokes ratio:

$$R(z, T) = \qquad \text{Equation (2)}$$
$$\left(\frac{\lambda_S}{\lambda_{AS}}\right)^4 \exp\left(\frac{-h\Delta v}{kT(z)}\right) \exp\left\{-\int_0^z [\alpha_{AS}(\xi) - \alpha_S(\xi)] d\xi\right\},$$

The expression for Equation (2) may account for the potentially different losses at the Stokes and anti-Stokes wavelengths. For Equation (2), R represents the power ratio of anti-Stokes and Stokes, z represents the position along the DUT, T represents the temperature, $\lambda_S$ represents the mean-weighted average wavelength of the Stokes profile, $\lambda_{AS}$ represents the mean-weighted average wavelength of the anti-Stokes profile, h represents the Planck's constant, k represents the Boltzmann constant, $\alpha_{AS}$ represents the DUT attenuation coefficient at $\lambda_{AS}$, $\alpha_S$ represents the DUT attenuation coefficient at $\lambda_{AS}$, ξ represents the position in the integral, and dξ represents an increment on position in the integral.

As disclosed herein, the spectral dependency of the phonon population within a single Raman anti-Stokes band may be utilized as the core mechanism for sensing. From Equation (1), the coefficient of variation of the Raman anti-Stokes power with temperature, as a function of frequency, may be determined. This coefficient may represent the derivative of the population with temperature, normalized to the population itself in order to express a sensitivity in %/K for Raman sensing, and may be expressed as follows:

$$s = \frac{d\eta}{\eta dT} = \frac{\frac{h\Delta v}{kT^2}\exp\left(\frac{h\Delta v}{kT}\right)}{\exp\left(\frac{h\Delta v}{kT}\right) - 1}$$ Equation (3)

Figure 3:
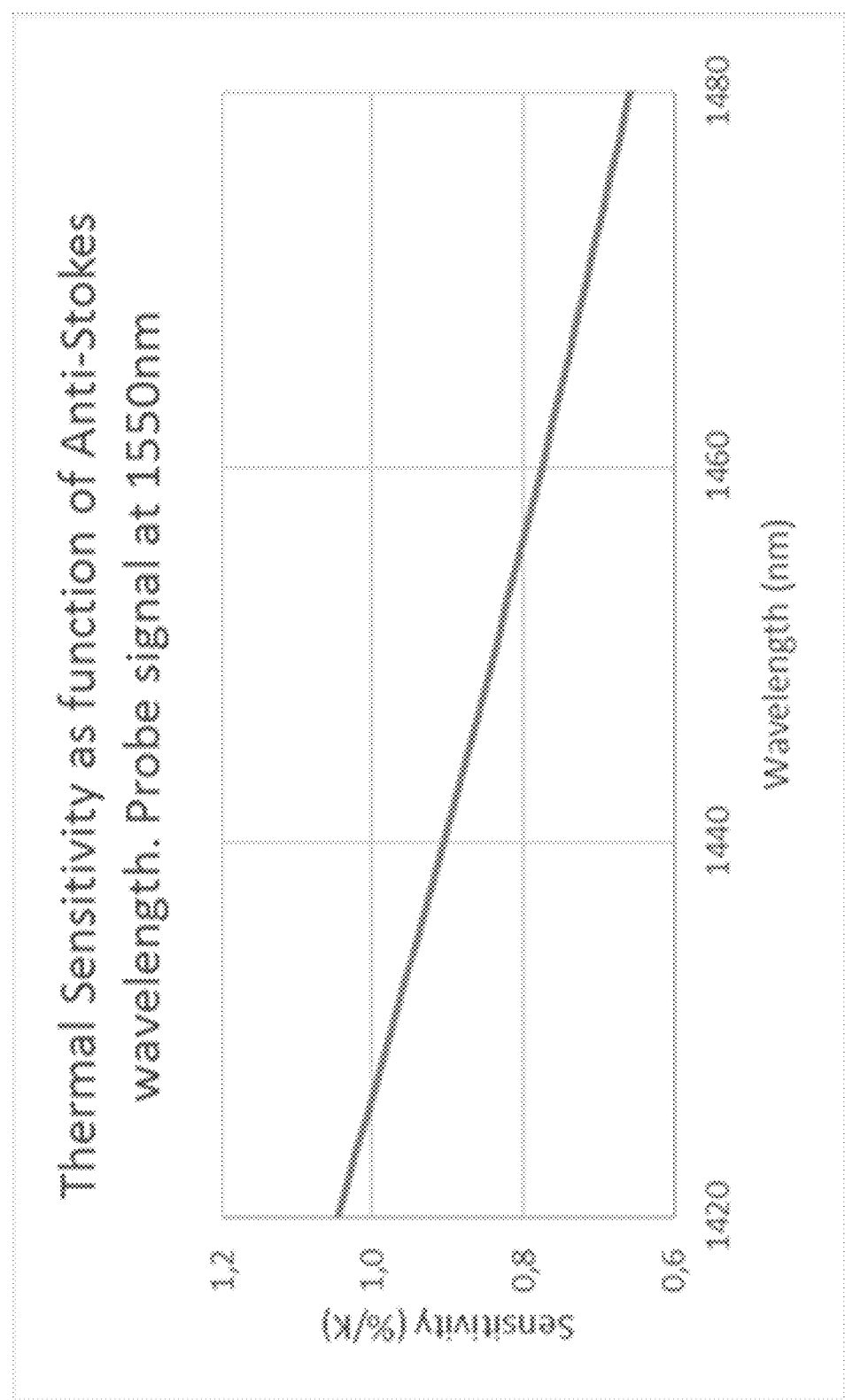
FIG. 3 illustrates the sensitivity as a function of wavelength, when a device under test is illuminated at 1550 nm, according to an example of the present disclosure.

FIG. 3 illustrates the sensitivity as a function of wavelength, when the DUT is illuminated at 1550 nm, according to an example of the present disclosure. The sensitivity may vary substantially across the useful range of the Raman profile. The mean value of 0.8%/K may be found at Raman resonance of 1450 nm, but sensitivity may vary from 0.95 to 0.72%/K for spectral components of 1430 to 1470 nm respectively. Thus, instead of making the ratio of the anti-Stokes to the Stokes and obtaining a final sensitivity of approximately 0.7%/K, by taking the ratio of two spectral components of the anti-Stokes which are 40 nm apart, a 0.23%/K sensitivity may be expected. This lower sensitivity value may increase the sensitivity to detection noises and lower the dynamic range. However, as will be described hereafter, several key advantages arise from the use of a reduced spectral range (e.g., 40 nm instead of 200 nm at 1550 nm).

Figure 4:
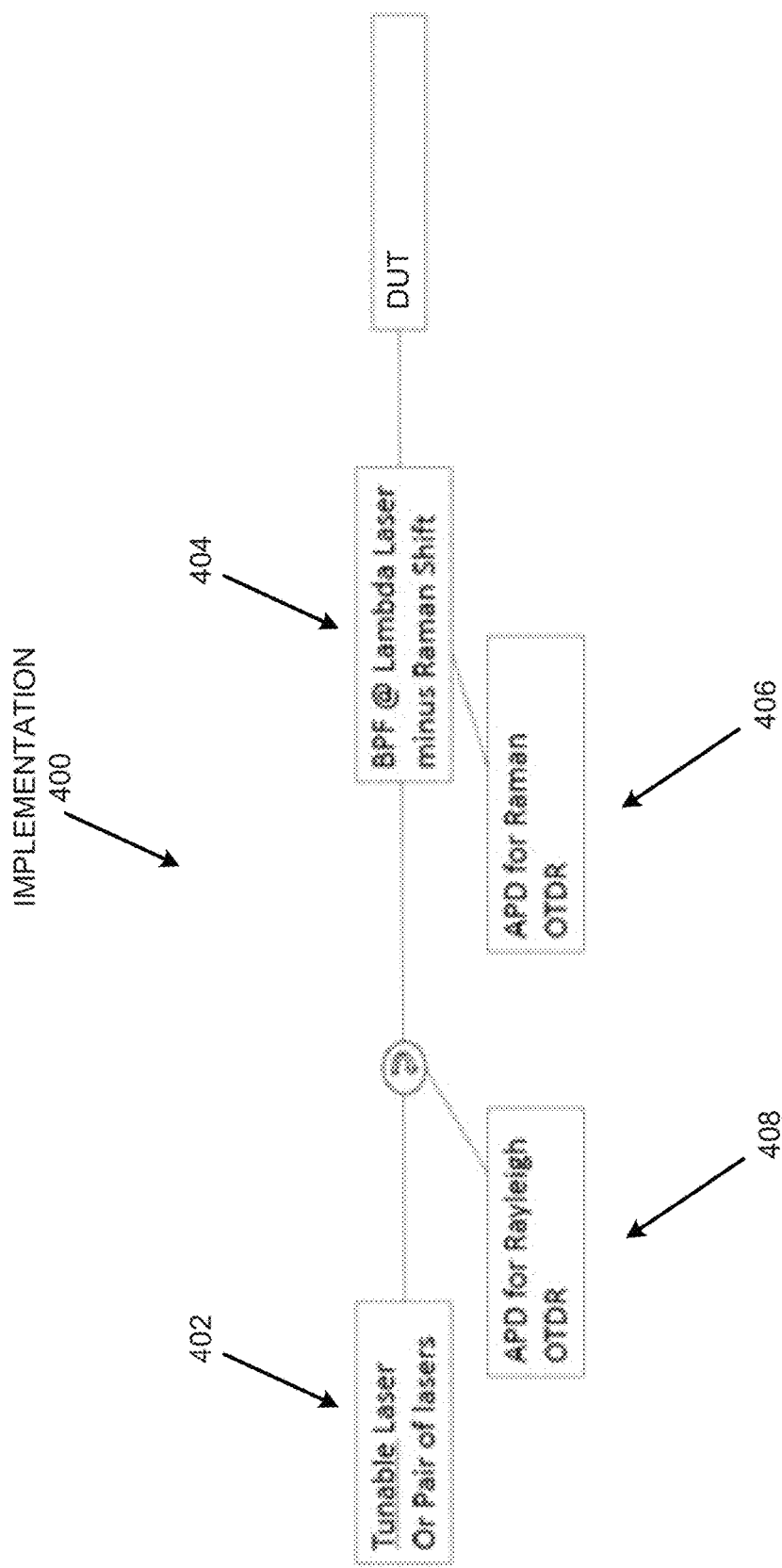
FIGS. 4-6 illustrate examples of implementation of the temperature distribution sensors of FIGS. 1 and 2, according to an example of the present disclosure.
Figure 5:
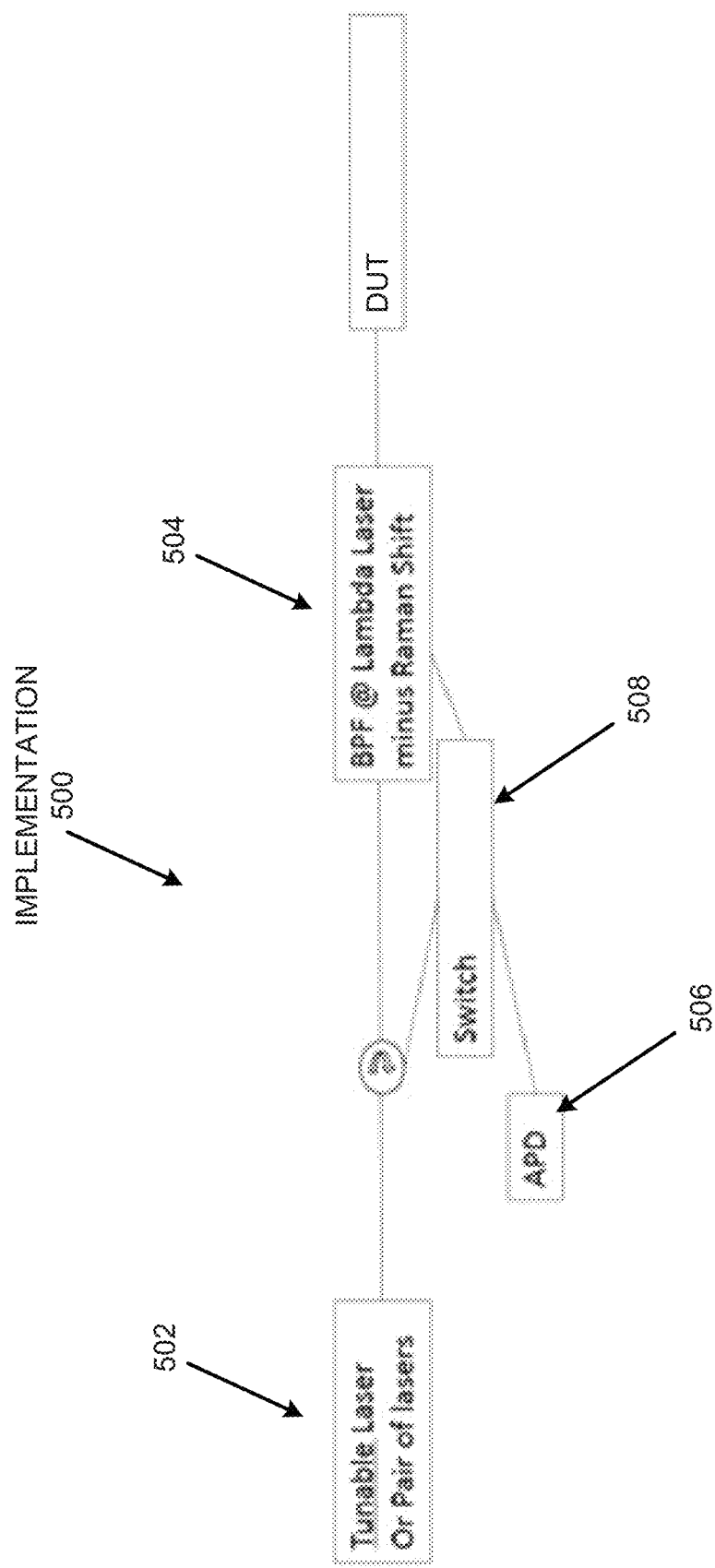
Figure 6:
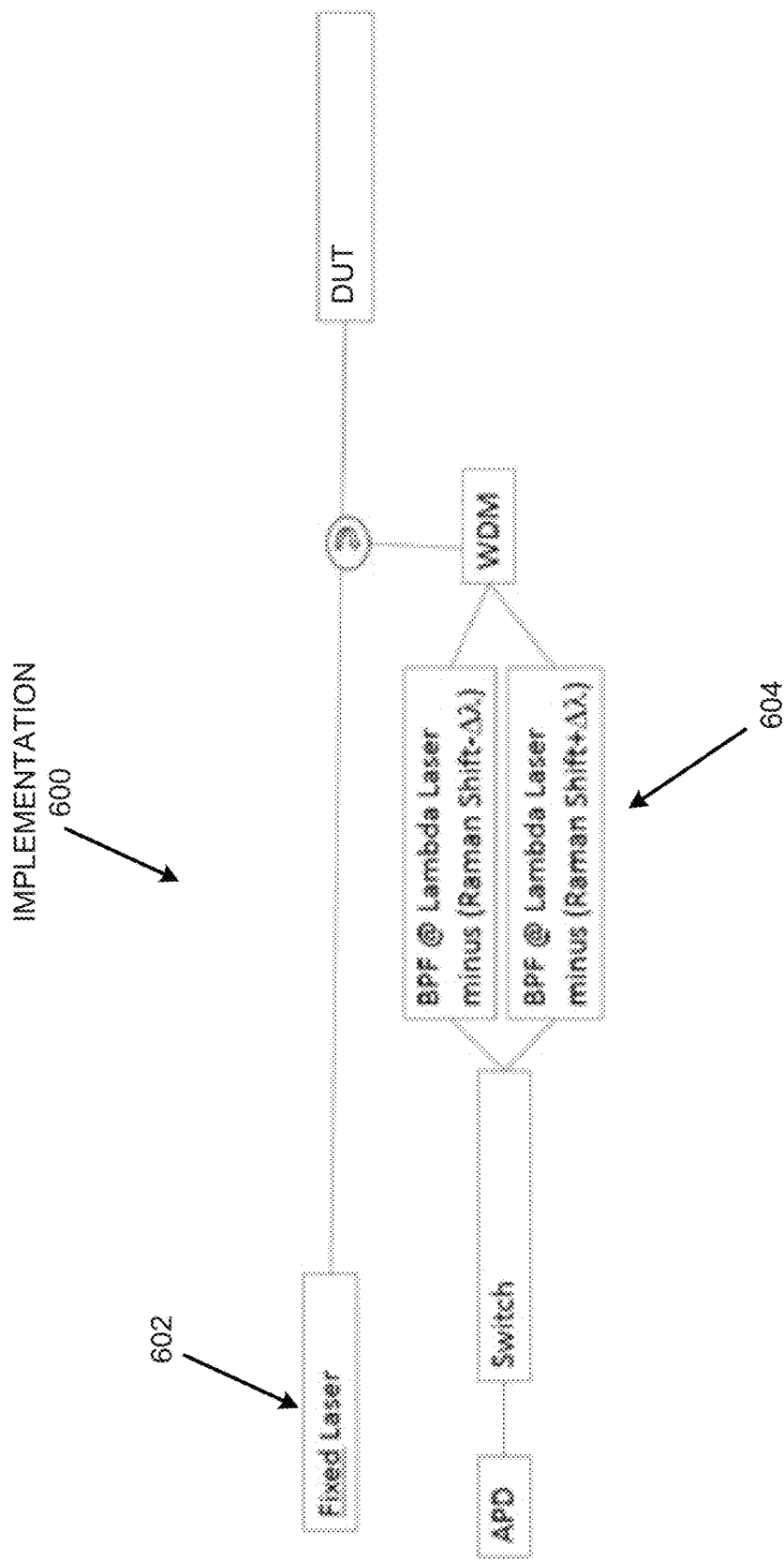

FIGS. 4-6 illustrate examples of implementation of the temperature distribution sensors of FIGS. 1 and 2, according to an example of the present disclosure.

Referring to FIG. 4, an implementation 400 of the sensor 100 (or the sensor 200) may include the laser source 102 (or the first laser source 202 and the second laser source 204) at section 402 of the sensor 100. At section 404 of the sensor 100, the bandpass filter 108 (or the bandpass filter 210) may be operatively disposed between the laser source 102 and the DUT 104, and may be configured to an anti-Stokes wavelength that is narrower than the Raman bandwidth. At section 406 of the sensor 100, the photodiode 110 (or the photodiode 212), designated as an avalanche photodiode (APD), may be operatively disposed between the bandpass filter 108 and the DUT 104 to acquire, from the DUT 104, anti-Stokes optical time-domain reflectometer traces for two preset wavelengths of the laser beam to determine the temperature distribution 112 for the DUT 104. At section 408 of the sensor 100, the further photodiode 114 (or the further photodiode 216) may be operatively disposed between the laser source 102 and the bandpass filter 108 to acquire Rayleigh optical time-domain reflectometer traces at the two preset wavelengths of the laser beam.

Referring to FIG. 5, a tunable laser and a fixed bandpass filter may be utilized.

Referring to FIG. 5, an implementation 500 of the sensor 100 (or the sensor 200) may include the laser source 102 (or the first laser source 202 and the second laser source 204) at section 502 of the sensor 100. At section 504 of the sensor 100, the bandpass filter 108 (or the bandpass filter 210) may be operatively disposed between the laser source 102 and the DUT 104, and may be configured to an anti-Stokes wavelength that is narrower than the Raman bandwidth. At section 506 of the sensor 100, a single photodiode 110 (or the photodiode 212) may be operatively connected to a switch at section 508 of the sensor 100. In this regard, the switch at section 508 of the sensor 100 may be operated so that the photodiode 110 (or the photodiode 212) is operatively disposed between the bandpass filter 108 and the DUT 104 to acquire, from the DUT 104, anti-Stokes optical time-domain reflectometer traces for two preset wavelengths of the laser beam to determine the temperature distribution 112 for the DUT 104. Further, the switch at section 508 of the sensor 100 may be operated so that the photodiode 110 (or the photodiode 212) is operatively disposed between the laser source 102 and the bandpass filter 108 to acquire Rayleigh optical time-domain reflectometer traces at the two preset wavelengths of the laser beam.

Referring to FIG. 6, an implementation 600 of the sensor 100 may include the laser source 102 at section 602 of the sensor 100. Laser pulses may be sent to the DUT. At section 604 of the sensor 100, backscattered radiation may be directed towards bandpass filters linked via wavelength division multiplexing (WDM) to successively record the anti-Stokes Raman OTDR trace at two optical frequencies. Alternatively, the switch and fixed filters may be replaced by a tunable filter. With respect to the aspect of "Lambda laser minus (Raman Shift−Δλ)" versus "Lambda laser minus (Raman Shift+Δλ)", in this implementation where two bandpass filters would be used, for an example with a single laser at 1550 nm, the Raman shift is ~100 nm, and for the anti-Stokes at 1450, there may be a bandpass at 1450−15 and a bandpass at 1450+15 nm.

As disclosed herein, a differential attenuation between the two preset wavelengths of the laser beam may be corrected by determining a ratio of the Rayleigh optical time-domain reflectometer traces at the two preset wavelengths of the laser beam. In this regard, in case of a high differential loss profile, it may be technically challenging to measure and account for the differential attenuation between the two anti-Stokes wavelengths, irrespective of how closely spaced they the anti-Stokes wavelengths are. In this regard, a tunable laser (e.g., 40 nm at 1550 nm) and a fixed bandpass filter, implemented as shown in FIGS. 4 and 5 may be utilized. With respect to FIGS. 4 and 5, the two backward Raman wavelength losses may be virtually identical as they are selected by the same bandpass filter. The losses at forward pulse wavelengths (e.g., forward losses), may now be different, and may be measured in the Rayleigh OTDR mode.

For a nominal case where the two test wavelengths are separated by approximately the Raman bandwidth, the loss in sensitivity to temperature may be equivalent to a loss of dynamic range, for example, by 2.6 dB. This value may represent a default value. However, compared to a dual wavelength setup, the optics of the implementation may allow to spare approximately 1.4 dB of dynamic range (e.g., 5 LOG).

Figure 7:
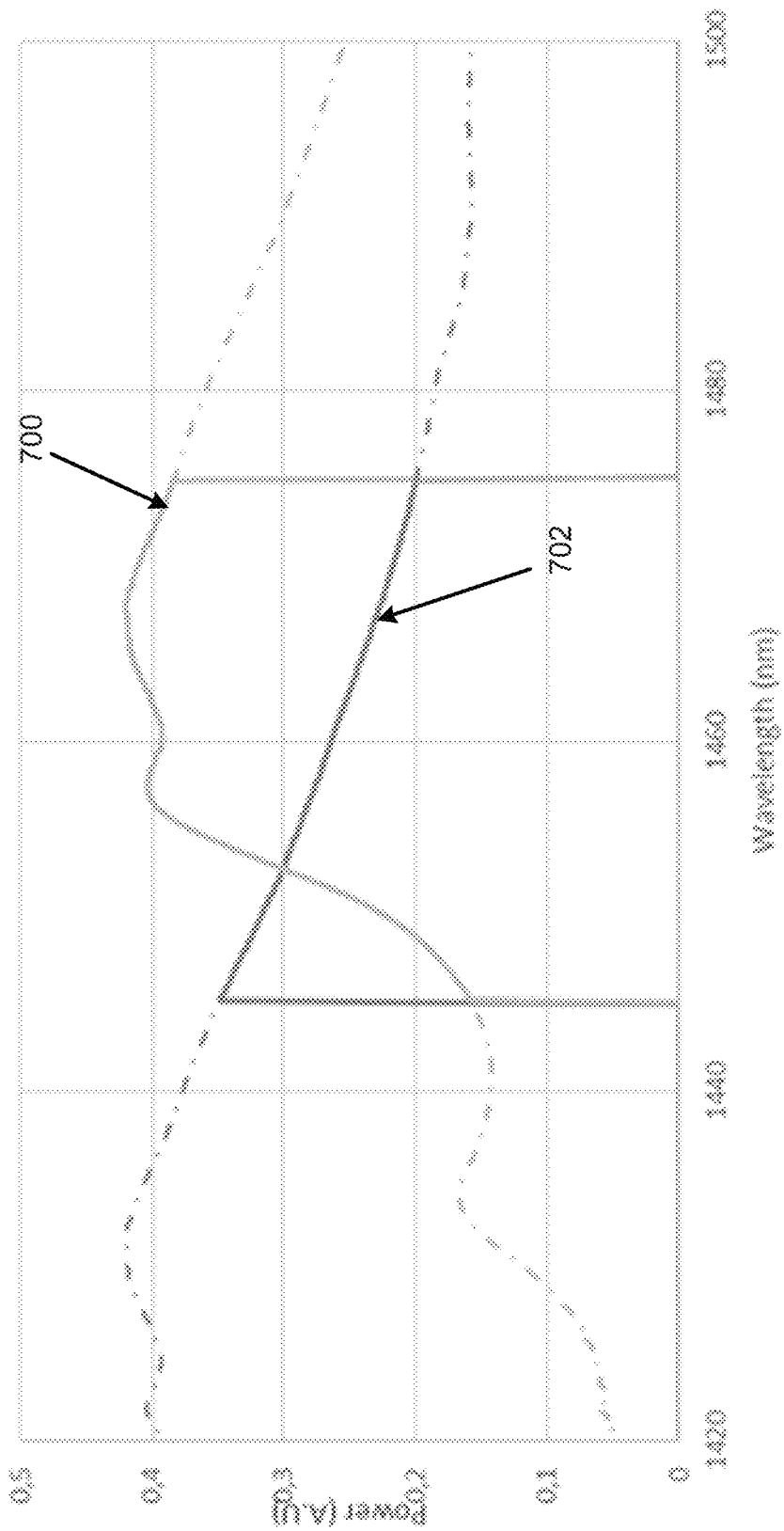
FIG. 7 illustrates a 30 nm bandpass filtered anti-stokes Raman spectra with test wavelengths at min-max of Erbium/C-band, according to an example of the present disclosure.

As disclosed herein, with respect to the anti-Stokes optical time-domain reflectometer traces for the two preset wavelengths of the laser beam, a wavelength difference resulting from differing anti-Stokes spectral slices and a corresponding mean weighted average wavelength may be corrected. In this regard, a relatively small difference of a few nm may remain in the mean-weighted-average anti-Stokes wavelength due to the Raman spectral shape. In this regard, FIG. 7 illustrates a 30 nm bandpass filtered anti-stokes Raman spectra with test wavelengths at min-max of Erbium/C-band, according to an example of the present disclosure. Referring to FIG. 7, with respect to the relatively small difference of a few nm that may remain in the mean-weighted-average anti-Stokes wavelength, this aspect may be evaluated in the graphic of FIG. 7 of the expected filtered spectra with two test wavelengths, for example, at 1529 and 1569 nm, and a bandpass of 30 nm. With respect to the two curves at 700 and 702, these curves may represent the two Raman spectra of backscattered radiation that is obtained when sending laser light at 1529 and 1569 nm, respectively. The spectra for the example of FIG. 7 may be windowed by the bandpass rectangular profile. The test wavelengths may be at the extremes of the C-band of fiber telecommunications, where sources and erbium doped fibers may be utilized. In order to mitigate any issues pertaining to the relatively small difference, scaling may be based on the width of bandpass (e.g., 3 nm for a 30 nm bandwidth for the following example), so that the difference may be reduced, at the cost of a lower signal power and therefore a lower dynamic range. Secondly from the knowledge of the origin of the losses (e.g., bending or darkening), the knowledge of the fiber attenuation at the two precisely defined laser wavelengths, and the knowledge of the test wavelengths including the two calibrated mean-weighted average anti-Stokes wavelengths, a differential loss may be extrapolated at those latter wavelengths to produce a further correction on the fiber losses.

Reducing the bandwidth of the Stokes band by use of a bandpass filter may provide for the reduction of the chromatic dispersion induced spatial spread and associated loss of spatial resolution, for example, in monomode fiber applications. In this regard, multimode applications may be primarily affected by modal dispersion.

Figure 8:
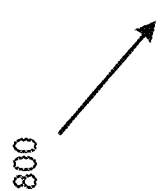
FIG. 8 illustrates a table of various consequences of bandpass filter width, as a guideline for the determination of an optimal value, according to an example of the present disclosure.

FIG. 8 illustrates a table of various consequences of bandpass filter width, as a guideline for the determination of an optimal value, according to an example of the present disclosure.

Referring to the table 800 of FIG. 8, a lower bandwidth may improve the wavelength definition (remaining differential loss problem) and the potential to reach longer distances while maintaining spatial resolution (CD problem). Further, a larger bandwidth may be utilized to maintain the dynamic range of an instrument (e.g., proportionally higher power). The columns of FIG. 8 may include bandpass filter width (nm), lambda error (nm), spread due to backward chromatic dispersion (CD) at 30 km (m), sensitivity, power, losses, and bill. For the table 800, bill may represent the sum of the various contributions to dynamic range (e.g., for row 1, 2.6+4.4−1.4=5.6 dB). With respect to the CD impact, the delay corresponding to the two extremes of the bandpass may be determined, for example, using 10 ps/nm/km at 1450 nm and 10 ns/m correspondence on an OTDR curve. For example, for row 1, 10 ps/nm/km×30 km×10 nm/10 ns/m=0.3 m.

In order to recover the temperature information, the two anti-Stokes powers at the two spectral slices, centered at $\Delta\vartheta_1$ and $\Delta\vartheta_2$ respectively, may follow Bose-Einstein statistics as follows:

$$I_{AS}(T, \Delta\vartheta_{1,2}) \sim \frac{1}{\exp\left(\frac{h\Delta\vartheta_{1,2}}{kT}\right)-1} \qquad \text{Equation (4)}$$

Referring to Equation (4), $I_{AS}$ represents the intensity detected, a quantity proportional to the anti-Stokes power, T represents the temperature, $\Delta\vartheta_{1,2}$ represents the mean-weighted average frequency shift for the anti-Stokes spectral slice considered, h represents the Planck's constant, and k represents the Boltzmann constant.

As disclosed herein, the temperature distribution 112 (or the temperature distribution 214) for the DUT may be determined by determining a ratio of the anti-Stokes optical time-domain reflectometer traces for the two preset wavelengths of the laser beam. The ratio of the two Stokes may be derived from OTDR traces for every point of the link. Further, the ratio may be normalized to the ratio measured in a reference section at a known temperature $T_0$ as follows (this may provide for elimination of the constants of proportionality disregarded in Equation (4)):

$$\frac{R(T)}{R(T_0)} = \frac{I_{AS}(T, \Delta\vartheta_2)}{I_{AS}(T, \Delta\vartheta_1)} * \frac{I_{AS}(T_0, \Delta\vartheta_1)}{I_{AS}(T_0, \Delta\vartheta_2)} = \qquad \text{Equation (5)}$$

$$\frac{\exp\left(\frac{h\Delta\vartheta_1}{kT}\right)-1}{\exp\left(\frac{h\Delta\vartheta_2}{kT}\right)-1} * \frac{\exp\left(\frac{h\Delta\vartheta_2}{kT_0}\right)-1}{\exp\left(\frac{h\Delta\vartheta_1}{kT_0}\right)-1}$$

Referring to Equation (5), R represents the anti-Stokes to Stokes ratio, $\Delta\vartheta_1$ represents the mean-weighted average frequency shift for spectral slice 1, and $\Delta\vartheta_2$ represents the mean-weighted average frequency shift for spectral slice 2. Equation (5) may be solved numerically to derive Tall along the fiber from a measured ratio.

The temperature distribution sensor 100 as disclosed herein may include a single source or a single-band solution. In this regard, the temperature distribution sensor 100 may include a relatively small tuning range or dual source, 20 nm broad/apart at 1064 nm, 40 nm broad/apart at 1550 nm.

The temperature distribution sensor 100 as disclosed herein may include a single source as disclosed herein. In this regard, at 1550 nm, C-Band components, fiber lasers, and fiber amplifiers based on Erbium dopant may be utilized. At 1064 nm, for example, Y-Band components and their capacity at producing 1040-1068 nm light may be utilized.

The temperature distribution sensor 100 as disclosed herein may provide for compensation of differential slope (e.g., with bending or bleaching). This may be associated with the same wavelength band in the anti-Stokes range (e.g., a power slope within band which create differing mean wavelengths anti-Stokes-1 (AS1) and anti-Stokes-2 (AS2), and two different probe wavelengths (e.g., 40 nm compared to the 100 nm of the dual-laser solution of FIG. 2). Differential fiber losses may be measured in Rayleigh mode at these two test probe wavelengths. The four slopes may provide for the quantification of the whole link (e.g., Rayleigh 1 (lambda 1 forward and lambda 1 backward), Rayleigh 2 (lambda 2 forward and lambda 2 backward), AS1 (lambda 1 forward and AS1 backward) and AS2 (lambda 2 forward and AS2 backward).

The temperature distribution sensor 100 as disclosed herein may provide for a single-ended test for temperature distribution. Thus, the temperature distribution sensor 100 as disclosed herein may eliminate the need for a dual-ended test, which may include installation constraints which may not be possible to implement.

The temperature distribution sensor 100 as disclosed herein may provide for an intrinsic tolerance to nonlinearity. The two test probes and backscattered signals may be considered as equal with regard to non-linearity given the very similar wavelengths, power levels, and fiber attenuation profiles. In other techniques with dual lasers or three bands, the nonlinearity may affect each measure differently (e.g., Anti-Stokes retrofitting energy to forward pulse, Rayleigh depleted by co-propagating forward Stokes pulses, Stokes band increased by Rayleigh scattering of the same forward Stokes pulse, etc.).

As disclosed herein, for the temperature distribution sensor 100, the laser source may include a narrow linewidth tunable laser. Thus, the sensor 100 may be operated using the narrow linewidth tunable laser source in a Rayleigh mode to record a distributed acoustic sensing signal over the DUT. In this regard, use of a narrow linewidth laser may provide for compatibility with a distributed acoustic sensing option. The Rayleigh section of the new distributed temperature sensing scheme previously described may include a direct-detection acquisition line that is also compatible with an intensity based distributed acoustic sensing. In this regard, a coherent detection scheme may provide a suitable mean for the differential slope compensations at source wavelengths, while also providing a higher sensitivity for an intelligent distributed acoustic sensor and the potential for a Phase-distributed acoustic sensing analysis. For example, in oil and gas applications, a distributed temperature sensing and a distributed acoustic sensing interrogator may be used alternatively and even simultaneously on the same sensing fiber with added value when crossing the respective information for these interrogators. Disposal of a tunable laser in the distributed acoustic sensing application with respect to wavelength diversity may provide for the reduction of the fading of the sensor response at locations of destructive interferences.

For the temperature distribution sensor 100 as disclosed herein, the narrow linewidth laser and narrow-filtered Raman signal may reduce the chromatic dispersion effect, which may limit the spatial resolution in long-distance monomode applications.

The temperature distribution sensor 100 as disclosed herein may be applicable to multimode applications. In this regard, the temperature distribution sensor 100 may require limited tunability (e.g., 20 nm@1064 nm) and a narrower bandpass.

For the temperature distribution sensor 100 as disclosed herein, a narrow bandpass filter may be used for the purpose of reducing the chromatic-dispersion-related loss of spatial resolution. This loss may be overcome with relatively large pulse power, and a higher power compared to all existing solutions that are affected by nonlinearity issues. The temperature distribution sensor 100 as disclosed herein may include a fiber amplifier and utilize larger peak powers than otherwise possible, which may result in a net gain on the dynamic range.

Figure 9:
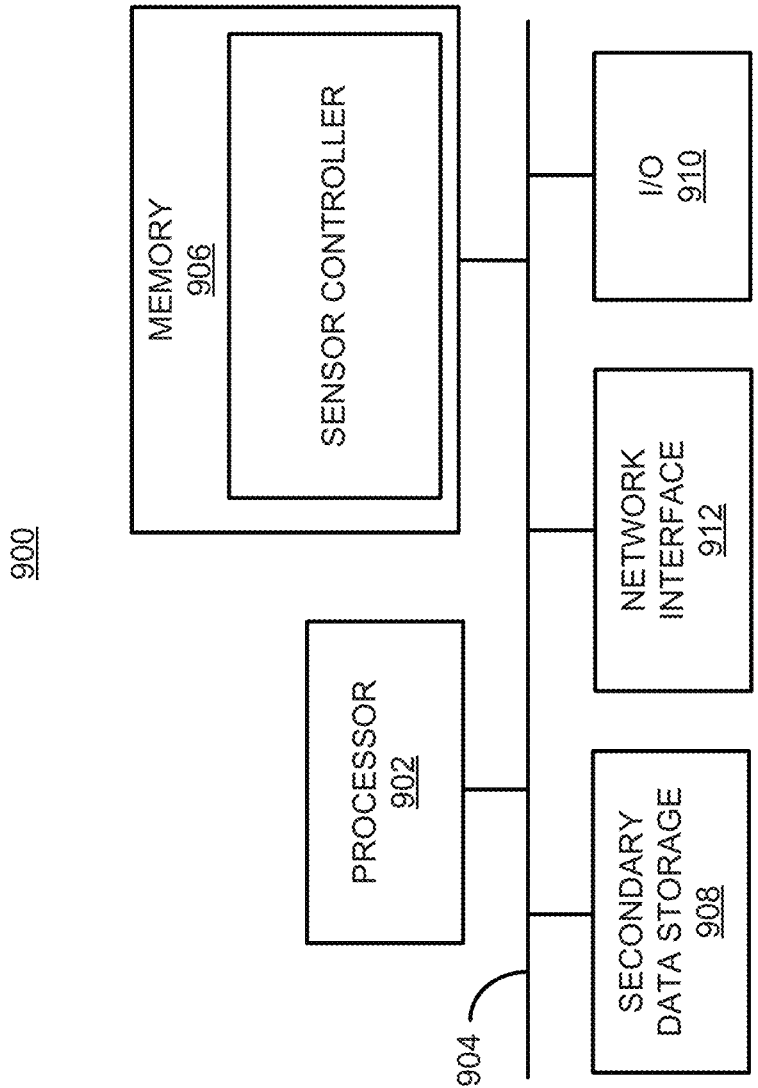
FIG. 9 illustrates a computer system, according to an example of the present disclosure.

FIG. 9 shows a computer system 900 that may be used with the examples described herein. The computer system may represent a generic platform that includes components that may be in a server or another computer system. The computer system 900 may be used as part of a platform for the sensor controller of FIG. 1 and/or FIG. 2. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include the sensor controller of FIG. 1 and/or FIG. 2 including machine readable instructions residing in the memory 906 during runtime and executed by the processor 902.

The computer system 900 may include an I/O device 910, such as a keyboard, a mouse, a display, etc. The computer system may include a network interface 912 for connecting to a network. Other known electronic components may be added or substituted in the computer system.

The processor 902 may be designated as a hardware processor. The processor 902 may execute operations associated with various components of the sensor 100. For example, the processor 902 may execute operations associated with the sensor controller of FIG. 1 and/or FIG. 2, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A temperature distribution sensor comprising:
   a laser source to emit a laser beam that is tunable over a wavelength range, wherein the wavelength range is less than a Raman bandwidth in a device under test (DUT), or of-the-order-of the Raman bandwidth in the DUT;
   a pulsed source to apply a pulse drive signal to the laser beam or to a modulator to modulate the laser beam that is to be injected into the DUT;
   a bandpass filter that is operatively disposed between the laser source and the DUT, wherein the bandpass filter is configured to an anti-Stokes wavelength that is narrower than the Raman bandwidth; and
   a photodiode that is operatively disposed between the bandpass filter and the DUT to acquire, from the DUT, anti-Stokes optical time-domain reflectometer traces for two preset wavelengths of the laser beam to determine a temperature distribution for the DUT.

2. The temperature distribution sensor according to claim 1, wherein the DUT includes an optical fiber.

3. The temperature distribution sensor according to claim 1, further comprising:
   a fiber amplifier to amplify the pulse drive signal applied to the laser beam or to the modulator to modulate the laser beam that is to be injected into the DUT.

4. The temperature distribution sensor according to claim 1, further comprising:
   a processor; and
   a memory storing machine readable instructions that when executed by the processor cause the processor to:
      determine the temperature distribution for the DUT by determining a ratio of the anti-Stokes optical time-domain reflectometer traces for the two preset wavelengths of the laser beam.

5. The temperature distribution sensor according to claim 1, further comprising:
   a processor; and
   a memory storing machine readable instructions that when executed by the processor cause the processor to:
      correct, for the anti-Stokes optical time-domain reflectometer traces for the two preset wavelengths of the laser beam, a wavelength difference resulting from differing anti-Stokes spectral slices and a corresponding mean weighted average wavelength.

6. The temperature distribution sensor according to claim 1, wherein the laser source is a narrow linewidth tunable laser, further comprising:
a processor; and
a memory storing machine readable instructions that when executed by the processor cause the processor to:
operating, using the narrow linewidth tunable laser source, in a Rayleigh mode to record a distributed acoustic sensing signal over the DUT.

7. The temperature distribution sensor according to claim 1, further comprising:
a further photodiode operatively disposed between the laser source and the bandpass filter to acquire Rayleigh optical time-domain reflectometer traces at the two preset wavelengths of the laser beam.

8. The temperature distribution sensor according to claim 7, further comprising:
a processor; and
a memory storing machine readable instructions that when executed by the processor cause the processor to:
correct a differential attenuation between the two preset wavelengths of the laser beam by determining a ratio of the Rayleigh optical time-domain reflectometer traces at the two preset wavelengths of the laser beam.

9. A temperature distribution sensor comprising:
a first laser source to emit a first laser beam;
a second laser source to emit a second laser beam, wherein the first and second laser beams include wavelengths that differ by a quantity that is
less than a Raman bandwidth in a device under test (DUT), or of-the-order-of the Raman bandwidth in the DUT;
a pulsed source to apply a pulse drive signal to the first and second laser beams or to a modulator to modulate the first and second laser beams that are to be injected into the DUT;
a bandpass filter that is operatively disposed between the first and second laser sources and the DUT, wherein the bandpass filter is configured to an anti-Stokes wavelength that is narrower than the Raman bandwidth; and
a photodiode that is operatively disposed between the bandpass filter and the DUT to acquire, from the DUT, anti-Stokes optical time-domain reflectometer traces for two preset wavelengths of the first and second laser beams to determine a temperature distribution for the DUT.

10. The temperature distribution sensor according to claim 9, wherein the DUT includes an optical fiber.

11. The temperature distribution sensor according to claim 9, further comprising:
a fiber amplifier to amplify the pulse drive signal applied to the first and second laser beams or to the modulator to modulate the first and second laser beams that are to be injected into the DUT.

12. The temperature distribution sensor according to claim 9, further comprising:
a processor; and
a memory storing machine readable instructions that when executed by the processor cause the processor to:
determine the temperature distribution for the DUT by determining a ratio of the anti-Stokes optical time-domain reflectometer traces for the two preset wavelengths of the first and second laser beams.

13. The temperature distribution sensor according to claim 9, further comprising:
a processor; and
a memory storing machine readable instructions that when executed by the processor cause the processor to:
correct, for the anti-Stokes optical time-domain reflectometer traces for the two preset wavelengths of the first and second laser beams, a wavelength difference resulting from differing anti-Stokes spectral slices and a corresponding mean weighted average wavelength.

14. The temperature distribution sensor according to claim 9, wherein the first or second laser source is a narrow linewidth tunable laser, further comprising:
a processor; and
a memory storing machine readable instructions that when executed by the processor cause the processor to:
operating, using the narrow linewidth tunable laser source, in a Rayleigh mode to record a distributed acoustic sensing signal over the DUT.

15. The temperature distribution sensor according to claim 9, further comprising:
a further photodiode operatively disposed between the first and second laser sources and the bandpass filter to acquire Rayleigh optical time-domain reflectometer traces at the two preset wavelengths of the first and second laser beams.

16. The temperature distribution sensor according to claim 15, further comprising:
a processor; and
a memory storing machine readable instructions that when executed by the processor cause the processor to:
correct a differential attenuation between the two preset wavelengths of the first and second laser beams by determining a ratio of the Rayleigh optical time-domain reflectometer traces at the two preset wavelengths of the first and second laser beams.

17. A computer implemented method comprising:
emitting, from a laser source, a laser beam that is tunable over a wavelength range, wherein the wavelength range is
less than a Raman bandwidth in a device under test (DUT), or of-the-order-of the Raman bandwidth in the DUT;
applying a pulse drive signal to the laser beam or to a modulator to modulate the laser beam that is to be injected into the DUT;
configuring a bandpass filter that is operatively disposed between the laser source and the DUT to an anti-Stokes wavelength that is narrower than the Raman bandwidth; and
determining a temperature distribution for the DUT by acquiring, from the DUT, anti-Stokes optical time-domain reflectometer traces for two preset wavelengths of the laser beam.

18. The method according to claim 17, wherein the DUT includes an optical fiber.

19. The method according to claim 17, further comprising:
acquiring Rayleigh optical time-domain reflectometer traces at the two preset wavelengths of the laser beam; and
correcting a differential attenuation between the two preset wavelengths of the laser beam by determining a ratio of the Rayleigh optical time-domain reflectometer traces at the two preset wavelengths of the laser beam.

20. The method according to claim 17, wherein determining the temperature distribution for the DUT by acquiring, from the DUT, the anti-Stokes optical time-domain reflectometer traces for the two preset wavelengths of the laser beam further comprises:

determining the temperature distribution for the DUT by determining a ratio of the anti-Stokes optical time-domain reflectometer traces for the two preset wavelengths of the laser beam.

* * * * *